Patented Aug. 10, 1954

2,686,177

UNITED STATES PATENT OFFICE 2,686,177

CUPRIFEROUS BENZTHIAZOLE DISAZO DYESTUFFS

Raymond Gunst, Binningen, Switzerland, assignor to Ciba Limited, Basel, Switzerland, a Swiss firm No Drawing. Application February 2, 1953,
Serial No. 334,712

Claims priority, application Switzerland
August 25, 1949

7 Claims. (Cl. 260—146)

1

This application is a continuation in part of my copending application Serial No. 180,697, filed August 21, 1950. The present invention is based on the observation that the cupriferous disazo dyestuffs of the formula (1)

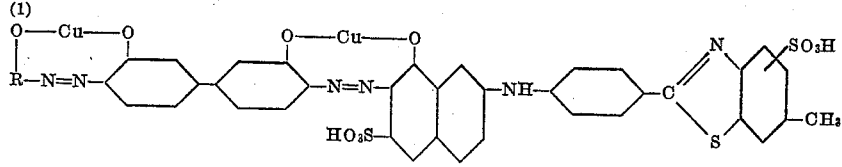

are very valuable dyestuffs. In this Formula 1, R stands for a naphthalene radical containing at least one sulfonic acid group, the azo and the —O—Cu— group being in ortho-position to each another. By virtue of the presence of the benzthiazole moiety, the said dyestuffs may be designated cupriferous benzthiazole disazo dyestuffs.

The cupriferous disazo dyestuffs corresponding to the Formula 1 can be obtained by subjecting disazo dyestuffs which correspond to the formula (2)

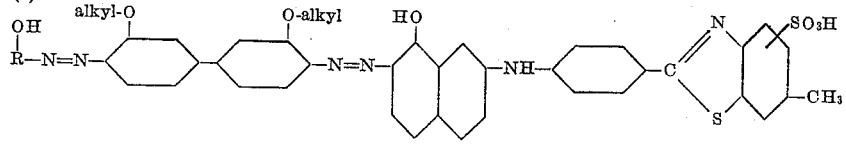

in which R represents a naphthalene radical with at least one sulfonic acid group, which radical is coupled in ortho-position to the hydroxyl groups, to the action of an agent providing copper, under conditions such, that splitting up of the —O—alkyl groups takes place with formation of the ortho:ortho'-dihydroxyazo copper complexes.

The disazo dyestuffs of the Formula 2 can be obtained by coupling a tetrazotized 3:3'-dialkoxy-4:4'-diaminodiphenyl, especially 3:3'-dimethoxy-4:4'-diaminodiphenyl, in either sequence, on one side with 2-[4'-(8''-hydroxynaphthyl-[2'']-aminophenyl)]-6-methyl-benzthiazole-X:6''-disulfonic acid and on the other side with a coupling component of the naphthalene series containing at least one sulfonic acid group and coupling in ortho-position to a hydroxyl group. As such naphthalene components coupling in ortho-position to a hydroxyl group there may be mentioned hydroxynaphthalene monosulfonic acids, such as 1-hydroxynaphthalene-4- or -5-sulfonic acid or 2-hydroxy-naphthalene-6-sulfonic acid. Hydroxynaphthalene - disulfonic acids, such as 1-hydroxynaphthalene-3:6- or 4:8-disulfonic acid or 2-hydroxynaphthalene-3:6-disulfonic acid may also be employed. Moreover, amino-hydroxynaphthalene-sulfonic acids, especially those of which the amino group contains substituents, such as 2-phenylamino-5-hydroxynaphthalene-7-sulfonic acid -3'- carboxylic

2 acid or 1-benzoyl-amino-8-hydroxynaphthalene-preferably carried out first since it is possible, and metrical dyestuff is obtained when the tetrazotized 3:3'-dialkoxy-4:4'-diaminodiphenyl is coupled twice with 2-[4'-(8''-hydroxynaphthyl-[2''] - aminophenyl)] - 6 - methyl - benzthiazole-X:6''-disulfonic acid.

The sequence of the two couplings may be as desired. As a rule, the coupling with the 2-[4'-(8'' - hydroxynaphthyl - [2''] - aminophenyl)]-6-methyl-benzthiazole-X:6''-disulfonic acid is often advantageous, to couple this component with the tetrazo compound in a weakly acid medium, for example at a pH ranging from 5 to 7, and, surprisingly, the coupling carried out in an acid medium also takes place in the 7''-position of this component. Even when the above mentioned symmetrical dyestuff is to be prepared coupling may be carried out in two stages, viz. in a slightly acid medium with the first molecular proportion of 2-[4' - (8'' - hydroxynaphthyl-[2'']-aminophenyl)] - 6 - methyl - benzthiazole-X:6''-disulfonic acid and then in an alkaline medium with the second molecular proportion of this coupling component.

A method for the preparation of the 2-[4'-(8''-hydroxynaphthyl - [2''] - aminophenyl)] - 6-methyl -benzthiazole-X:6''-disulfonic acid corre-

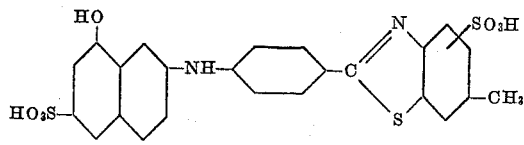

sponding to the formula is given in example below.

According to the present invention the disazo dyestuffs of the Formula 2 are treated in such a way with an agent providing copper that with splitting up of the alkoxy groups contained in the diaminodiphenyl radicals, the corresponding ortho:ortho'-dihydroxyazo copper complexes are produced. Methods which lead to such a dialkylating coppering are generally known. In many cases, that process has proved especially suitable according to which, with the application of copper tetrammine complexes in the presence or absence of an excess of ammonia, the coppering is carried out in an aqueous medium for several hours at a temperature in the neighborhood of 100° C. Of particular advantage in many cases is the process according to which the operation is conducted in the presence of hydroxyalkylamines, especially ethanolamine or of copper complexes derived therefrom.

With regard to the formulae of the cupriferous dyestuffs it should be explained that these formulae undoubtedly represent the correct stoichiometric quantities of copper and the correct position of the copper atom in the complex, but the distribution of the main and secondary valences in the complex union of the copper has not yet been established with certainty. The new cupriferous disazo dyestuffs of the Formula 1 can be employed for the dyeing and printing of a wide variety of materials, such as wool and silk, but especially fibers containing cellulose, such as cotton, linen and also artificial silk and staple fibers of regenerated cellulose. Very interesting shades are obtained of very good fastness to light.

In the following Example the parts and percentages are by weight unless otherwise stated, the relation between parts by weight and parts by volume being the same as that between the kilogram and the liter.

*Example*

12.2 parts of 3:3'-dimethoxy-4:4'-diaminodiphenyl are tetrazotized in known manner. 27.5 parts of 2 - [4 - (8'' - hydroxynaphthyl - [2'']- aminophenyl)] - 6 - methyl - benzthiazole-X:6''-disulfonic acid are dissolved in 200 parts of water with the addition of the quantity of sodium hydroxide solution necessary for the formation of the neutral sodium salt and 14 parts of crystallized sodium acetate are added. This solution is combined with the tetrazo solution at 0° C. while stirring vigorously. After several hours' stirring the tetrazo compound cannot be detected any longer and the solution is then caused to flow into a solution of a further 28 parts of 2-[4'-(8''-hydroxynaphthyl - [2''] - aminophenyl)] - 6-methyl-benzthiazole-X:6''-disulfonic acid, dissolved in 200 parts of water with the addition of 35 parts of anhydrous sodium carbonate. The second coupling proceeds slowly. When it has come to an end, the reaction mixture is heated and the disazo dyestuff is salted out and filtered off.

In order to transform the dyestuff into its complex copper compound, the filter cake is dissolved in 700 parts of water at 95° C., an aqueous ammoniacal solution of cupric tetrammine sulfate, the copper content of which corresponds to 25 parts of crystallized cupric sulfate, and 10 parts of monoethanolamine are added. After twelve hours' stirring at 90–95° C. the cupriferous disazo dyestuff of the formula

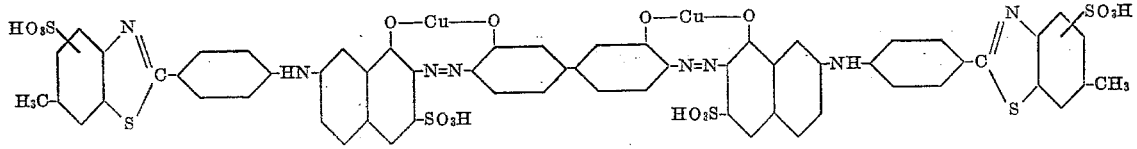

is precipitated by the addition of sodium chloride and filtered off. It dyes cellulosic fibers neutral to weakly bluish grey shades having good fastness to light.

A very similar dyestuff is obtained by replacing for the second coupling the 28 parts of 2-[4'-(8''-hydroxynaphthyl - [2''] - aminophenyl)] - 6-methyl - benzthiazole - X:6'' - disulfonic acid by 22 parts of 1 - benzolylamino - 8 - hydroxynaphthalene-3:6-disulfonic acid and otherwise proceeding in the same manner as described. Other unsymmetrical dyestuffs of similar properties but yielding somewhat more bluish shades on cotton are obtained by using for the second coupling 2 - (3' - carboxyphenyl) - amino-5 - hydroxynaphthalene - 7 - sulfonic acid or 1 - hydroxynaphthalene - 4 - sulfonic acid or 2-hydroxynaphthalene-6-sulfonic acid. The dyestuffs so obtained correspond to the formulae

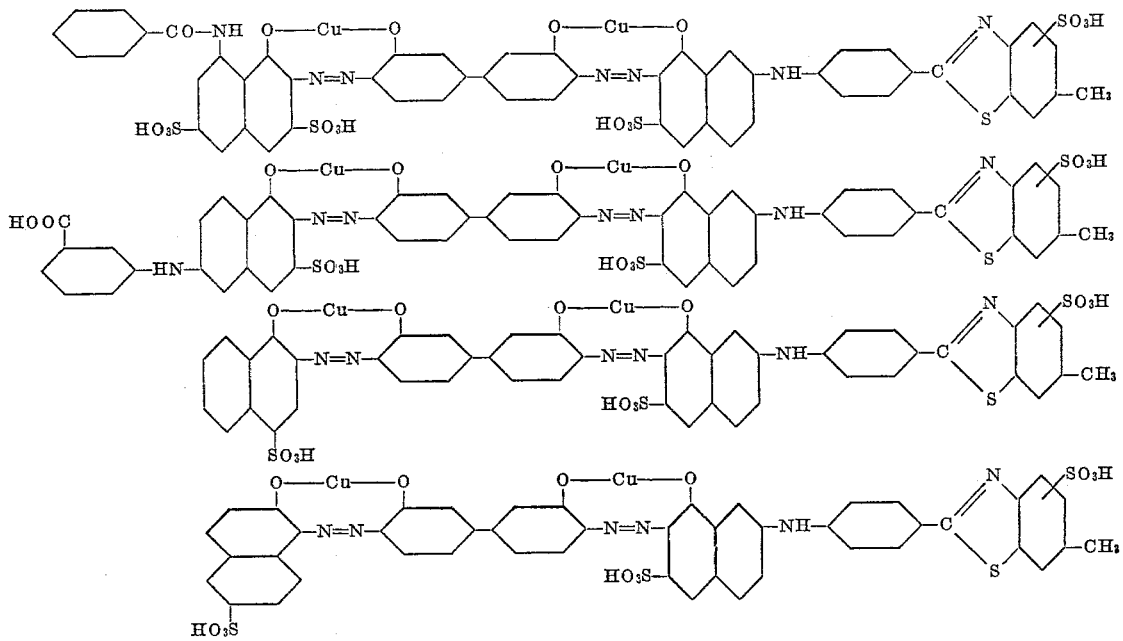

The 2 - [4' - (8'' - hydroxynaphthyl - [2'']- aminophenyl)] - 6 - methylbenzthiazole - X:6''- disulfonic acid used as starting material in this example can be produced as follows:

24.0 parts of 1:7-dihydroxynaphthalene-3-sulfonic acid are suspended in 500 parts of commercial sodium bisulfite solution. At 95° C. 46 parts of 2-(4'-aminophenyl)-6-methyl-benzthiazole-X-sulfonic acid (obtained by sulfonation of 2-(4'-aminophenyl)-6-methyl-benzthiazole with fuming sulfuric acid) are introduced and the reaction mixture is maintained for 60 hours with stirring and reflux cooling at 95–97° C. After cooling, the condensation product which is difficultly soluble in acid solution, is filtered off. For purification the filter residue is dissolved in the hot in a medium alkaline with sodium carbonate and freed from any insoluble residue by filtration. By addition of dilute hydrochloric acid the condensation product is precipitated as an orange-brown deposit. If desired the condensation product can be freed from sulfurous acid by heating the suspension, until the sulfurous acid has completely evaporated.

What I claim is:

1. A cupriferous benzthiazole disazo dyestuff of the formula

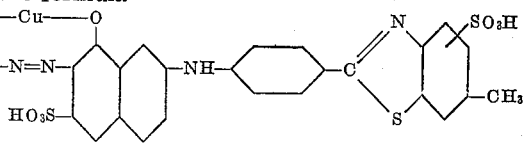

in which R stands for the radical of a coupling component of the naphthalene series, the naphthalene nucleus of which contains at least one sulfonic acid group, the azo and the —O—Cu— group being bound to the naphthalene nucleus and standing in ortho-position to each another.

2. A cupriferous benzthiazole disazo dyestuff of the formula

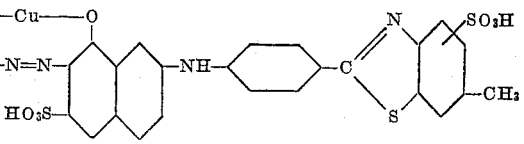

in which the azo and the —O—Cu— group are in ortho-position to each another.

3. The cupriferous benzthiazole disazo dyestuff of the formula

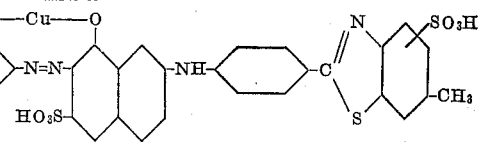

4. The cupriferous benzthiazole disazo dyestuff of the formula

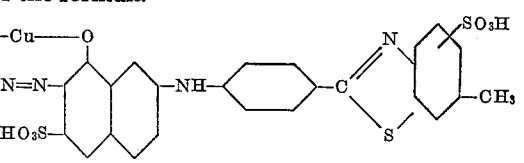

5. The cupriferous benzthiazole disazo dyestuff of the formula

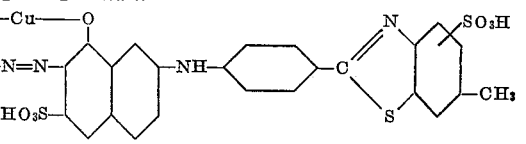

6. The cupriferous benzthiazole disazo dyestuff of the formula

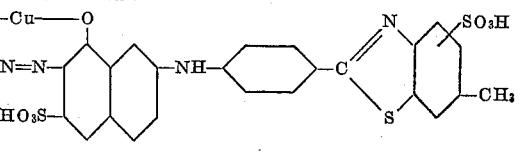

7. The cupriferous benzthiazole disazo dyestuff of the formula

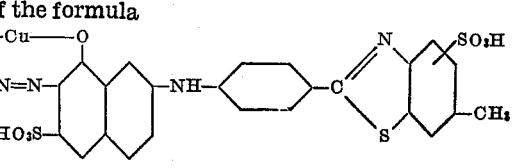

References Cited in the file of this patent

UNITED STATES PATENTS

| Number | Name | Date |
| --- | --- | --- |
| 1,052,136 | Desmali et al. | Feb. 4, 1913 |
| 1,667,327 | Mayer et al. | Apr. 24, 1928 |
| 2,273,823 | Sieglitz et al. | May 19, 1942 |

FOREIGN PATENTS

| Number | Country | Date |
| --- | --- | --- |
| 1,024,021 | France | Jan. 7, 1953 |